US012767833B2

(12) United States Patent
Shiao et al.

(10) Patent No.: US 12,767,833 B2
(45) Date of Patent: Oct. 20, 2026

(54) ROOFING SYSTEM AND ROOFING SHINGLE

(71) Applicant: BMIC LLC, Dallas, TX (US)

(72) Inventors: Ming-Liang Shiao, Collegeville, PA (US); Olan T. Leitch, Nashville, TN (US); Ashley Alfonso, Fanwood, NJ (US)

(73) Assignee: BMIC LLC, Dallas, TX (US)

( * ) Notice: Subject to any disclaimer, the term of this patent is extended or adjusted under 35 U.S.C. 154(b) by 240 days.

(21) Appl. No.: 18/618,651

(22) Filed: Mar. 27, 2024

(65) Prior Publication Data

US 2024/0327649 A1 Oct. 3, 2024

Related U.S. Application Data

(60) Provisional application No. 63/492,662, filed on Mar. 28, 2023.

(51) Int. Cl.

*E04D 1/20* (2006.01)
*C09D 5/33* (2006.01)
*C09D 7/62* (2018.01)
*C09D 195/00* (2006.01)
*E04D 1/00* (2006.01)

(52) U.S. Cl.

CPC ............... *C09D 5/004* (2013.01); *C09D 7/62* (2018.01); *C09D 195/00* (2013.01); *E04D 1/20* (2013.01); *E04D 2001/005* (2013.01)

(58) Field of Classification Search

CPC .... E04D 1/00; E04D 1/20; E04D 1/30; E04D 2001/005; E04D 11/00; C09D 1/02; C09D 7/00

USPC ............................................................ 52/518

See application file for complete search history.

(56) References Cited

U.S. PATENT DOCUMENTS

| | | | |
|---|---|---|---|
| 7,241,500 B2 | 7/2007 | Shiao et al. | |
| 7,805,909 B2 | 10/2010 | Teng et al. | |
| 8,790,778 B2 | 7/2014 | Shiao et al. | |
| 8,865,303 B2 | 10/2014 | Sexauer et al. | |
| 9,303,407 B2 | 4/2016 | Sexauer et al. | |
| 9,404,263 B2 * | 8/2016 | Kiik | E04D 3/35 3/35 |
| 9,422,719 B2 * | 8/2016 | Shiao | B32B 5/16 1/28 |
| 9,714,512 B2 | 7/2017 | Sexauer et al. | |
| 9,890,288 B2 | 2/2018 | Kratochvil et al. | |
| 10,066,153 B2 | 9/2018 | Grove, III | |
| 10,145,115 B2 | 12/2018 | Sexauer et al. | |
| 10,214,449 B2 * | 2/2019 | Kalkanoglu | C04B 7/02 7/2 |
| 10,253,493 B2 | 4/2019 | Jenree et al. | |
| 10,259,974 B2 * | 4/2019 | Hofmann | C09D 195/00 |
| 10,501,636 B2 | 12/2019 | Jenree et al. | |

(Continued)

*Primary Examiner* — Joshua J Michener
*Assistant Examiner* — Henry Hooper Mudd
(74) *Attorney, Agent, or Firm* — GREENBERG TRAURIG, LLP

(57) ABSTRACT

A roofing shingle includes an asphalt-filled layer on a surface of a substrate, and a plurality of coated granules on the asphalt-filled layer, where each of the coated granules of the plurality of coated granules has a base particle, and a coating including metal silicate and a reflective pigment, where the coated granules of the plurality of coated granules have an average L* value of less than 30, and a total solar reflectance of 20% to 40%.

20 Claims, 1 Drawing Sheet

(56) References Cited

U.S. PATENT DOCUMENTS 10,704,262 B2 7/2020 Canova et al.
10,724,245 B2 7/2020 Sexauer et al.
11,479,675 B2 10/2022 Jenree et al.
11,649,633 B2 5/2023 Canova et al.
11,691,155 B2 7/2023 Pitchumani et al.
11,846,098 B2 12/2023 Smith
12,365,627 B2 * 7/2025 Siao ........................ C04B 20/12 20/123
12,492,556 B2 * 12/2025 Lai ............................ E04D 1/20 1/20
2009/0110818 A1 4/2009 Teng et al.
2011/0081537 A1 4/2011 Sexauer et al.
2012/0157583 A1 * 6/2012 Shiao ...................... C08L 95/00 524/64
2015/0259922 A1 9/2015 Sexauer et al.
2015/0329768 A1 11/2015 Grove, III
2016/0273223 A1 9/2016 Sexauer et al.
2017/0158865 A1 6/2017 Kratochvil et al.
2017/0321424 A1 11/2017 Sexauer et al.
2018/0058065 A1 3/2018 Jenree et al.
2018/0087275 A1 3/2018 Canova et al.
2018/0163057 A1 6/2018 Jenree et al.
2019/0100921 A1 4/2019 Sexauer et al.
2020/0308413 A1 10/2020 Jenree et al.
2020/0325683 A1 10/2020 Canova et al.
2020/0407975 A1 12/2020 Smith
2022/0049500 A1 * 2/2022 Amsden .................... E04D 7/00 7/5
2022/0080429 A1 3/2022 Pitchumani et al.
2022/0177707 A1 6/2022 Pitchumani et al.
2022/0209215 A1 6/2022 Pitchumani et al.
2022/0290435 A1 9/2022 Hong et al.
2022/0372299 A1 11/2022 Grove et al.
2023/0295928 A1 * 9/2023 Edwards ................... E04D 7/00 7/5

* cited by examiner

ROOFING SYSTEM AND ROOFING SHINGLE

CROSS-REFERENCE TO RELATED APPLICATION

This application claims priority to U.S. provisional application No. 63/492,662, titled "ROOFING SYSTEM, AND ASSOCIATED ROOFING SHINGLE AND METHOD," filed Mar. 28, 2023, the disclosure of which is incorporated by reference herein in its entirety.

FIELD

The present application relates to a roofing system, and, more particularly, to a roofing system that includes a roofing shingle with granules.

BACKGROUND

In a known roofing system, a plurality of roofing shingles is installed above a roof deck. Often, the top surface of each of the roofing shingles includes a plurality of granules.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the present invention provides a roofing shingle, comprising: a substrate, having a top surface and a bottom surface opposite the top surface; an asphalt-filled layer on the top surface of the substrate; and a plurality of coated granules on the asphalt-filled layer, wherein each of the coated granules of the plurality of coated granules comprises: a base particle, and a coating, comprising: metal silicate, and a reflective pigment, wherein the coated granules of the plurality of coated granules have an average L* value of less than 30, and a total solar reflectance of 20% to 40%.

In some embodiments, each of the base particles comprises at least one of igneous rock, carbonaceous rock, and combinations thereof.

In some embodiments, each of the base particles has a total solar reflectance of at least 20%.

In some embodiments, the plurality of coated granules covers at least 80% of a total surface area of a top surface of the roofing shingle.

In some embodiments, the plurality of coated granules covers at least 90% of the total surface area of the top surface of the roofing shingle.

In some embodiments, each of the base particles has a particle size of at most US sieve #6, and of at least US sieve #80.

In some embodiments, the present invention provides a roofing shingle, comprising: a substrate, having a top surface and a bottom surface opposite the top surface; an asphalt-filled layer on the top surface of the substrate; and a plurality of coated granules on the asphalt-filled layer, wherein each of the coated granules of the plurality of coated granules comprises: a base particle, and a coating, comprising: metal silicate, and a reflective pigment, wherein the coated granules of the plurality of coated granules have: an average L* value, and a total solar reflectance, wherein a ratio of the average L* value to the total solar reflectance is at most 150.

In some embodiments, the ratio is 75 to 150.

In some embodiments, each of the base particles comprises at least one of igneous rock, carbonaceous rock, and combinations thereof.

In some embodiments, each of the base particles has a total solar reflectance of at least 20%.

In some embodiments, the present invention provides a shingle bundle, comprising: a first roofing shingle, and a second roofing shingle stacked on the first roofing shingle, wherein each of the first roofing shingle and the second roofing shingle comprises: a substrate, having a top surface and a bottom surface opposite the top surface; an asphalt-filled layer on the top surface of the substrate; and a plurality of coated granules on the asphalt-filled layer, wherein each of the coated granules of the plurality of coated granules comprises: a base particle, and a coating, comprising: metal silicate, and a reflective pigment, wherein the coated granules of the plurality of coated granules have an average L* value of less than 30, and a total solar reflectance of at least 20%.

In some embodiments, the present invention provides a method, comprising: obtaining a substrate, the substrate having a top surface and a bottom surface opposite the top surface; coating at least a portion of the top surface of the substrate with an asphalt-filled material, thereby forming an asphalt-filled layer on the substrate; and disposing a plurality of coated granules on the asphalt-filled layer, wherein each of the coated granules of the plurality of coated granules comprises: a base particle, and a coating, comprising: metal silicate, and a reflective pigment, wherein the coated granules of the plurality of coated granules have an average L* value of less than 30, and a total solar reflectance of at least 20%.

In some embodiments, the present invention provides a method, comprising: obtaining a substrate, the substrate having a top surface and a bottom surface opposite the top surface; coating at least a portion of the top surface of the substrate with an asphalt-filled material, thereby forming an asphalt-filled layer on the substrate; and disposing a plurality of coated granules on the asphalt-filled layer, wherein each of the coated granules of the plurality of coated granules comprises: a base particle, and a coating, comprising: metal silicate, and a reflective pigment, wherein the coated granules of the plurality of coated granules have: an average L* value, and a total solar reflectance, wherein a ratio of the average L* value to the total solar reflectance is at most 150.

In some embodiments, the ratio is layer 75 to 150.

In some embodiments, the present invention provides a system, comprising: a roof deck; and a first roofing shingle installed on the roof deck, wherein the first roofing shingle comprises: a substrate; an asphalt-filled layer on a surface of the substrate; and a plurality of coated granules on the asphalt-filled layer, wherein each of the coated granules of the plurality of coated granules comprises: a base particle, and a coating, comprising: metal silicate, and a reflective pigment, wherein the coated granules of the plurality of coated granules have an average L* value of less than 30, and a total solar reflectance of 20% to 40%.

BRIEF DESCRIPTION OF THE DRAWINGS

This section refers to the drawings that form a part of this disclosure, and which illustrate some of the embodiments of structure, materials, and/or methods of the present invention described herein.

DETAILED DESCRIPTION

Figure 1:
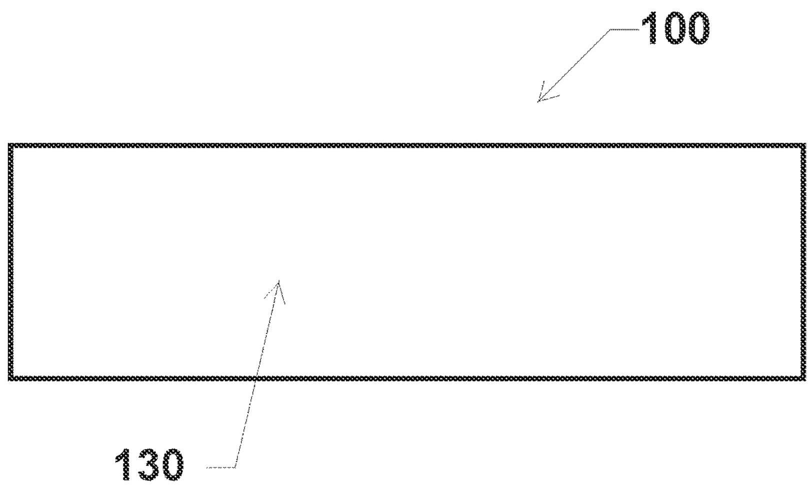
FIG. 1 is a top view of a roofing shingle, in accordance with some embodiments of the invention.

In addition to the benefits and improvements that the Specification discloses, other objects and advantages of that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the Specification, including the Detailed Description and Claims, the following terms take the meanings explicitly associated herein, unless the context dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," "with," and any similar phrase or phrases, do not limit the scope of a specific claim to the materials or steps recited by the claim.

As used herein, the term "L* value" refers to an L* value in accordance with CIE LAB color data using D65 illumination and 10 degree observer.

As used here, the term "average L* values" refers to measurements of two or more L* values, and the average or mean of the L* values.

As used herein, a "steep slope" roof or roof deck has a pitch of Y/X, where Y and X are in a ratio of 4:12 to 20:12, where Y corresponds to the "rise" of the roof or roof deck, and where X corresponds to the "run" of the roof or roof deck.

As used herein, installation "above" refers to installation either directly on (that is, with no intervening layer or layers therebetween) or indirectly on (that is, with one or more intervening layers therebetween).

As used herein, the total solar reflectance (TSR) is measured by using the test method described in ASTM C1549-2022 using air mass 1.5.

As used herein, the "ratio" of the average L* value to the total solar reflectance (TSR) is computed by converting the total solar reflectance from a percentage to a decimal value (for example, 20% to 0.20), and dividing the average L* value by the decimal value of the total solar reflectance—thus, for example, the ratio of an average L* value of 30 to a total solar reflectance of 20% is 150 (30/0.20=150). In some embodiments, the present invention provides a roofing shingle.

In some embodiments, the roofing shingle is a three-tab shingle. In some embodiments, the roofing shingle is a laminated shingle. In some embodiments, the roofing shingle is an architectural shingle.

In some embodiments, the roofing shingle may be installed over a roof deck. In some embodiments, the roof deck may be of a residential structure. In some embodiments, the roof deck may be of a commercial structure. In some embodiments, the roof deck may be of an industrial structure. In some embodiments, the roof deck may be a steep slope roof deck. In some embodiments, the roof deck may a sloped roof deck having a slope less than that of a steep slope roof. In some embodiments, the roof deck may be flat—that is, the roof deck may have no slope.

In some embodiments, the roofing shingle includes a substrate, having a top surface and a bottom surface opposite the top surface. In some embodiments, the substrate includes a cellulosic substrate, a woven mat, a nonwoven a fabric, a glass mat, a fiberglass mat, a polyester mat, a scrim, a coated scrim, a bitumen substrate, and/or another material or other materials, and/or combinations thereof.

In some embodiments, the roofing shingle includes a layer on the bottom surface of the shingle. In some embodiments, the layer on the bottom surface includes asphalt. In some embodiments, the layer on the bottom surface includes polymer. In some embodiments, the layer on the bottom surface includes a film. In some embodiments, the layer on the bottom surface includes a polymer film. In some embodiments, the layer on the bottom surface includes fines. In some embodiments, the layer on the bottom surface includes granules. In some embodiments, the bottom surface omits a layer.

In some embodiments, the roofing shingle includes an asphalt-filled layer on the top surface of the substrate. In some embodiments, the asphalt-filled layer includes asphalt and a filler material. In some embodiments, the filler includes limestone. In some embodiments, the asphalt includes blown asphalt, poly(methyl acrylate) (PMA), or styrene-butadiene-styrene (SBS). In some embodiments, the roofing shingle includes a polymer-modified asphalt (PMA) layer.

In some embodiments, the roofing shingle includes a plurality of coated granules on the asphalt-filled layer. In some embodiments, one or more of the coated granules of the plurality of coated granules includes a base particle. In some embodiments, one or more of the base particles is a mineral base particle. In some embodiments, each of the coated granules of the plurality of coated granules includes a mineral base particle.

In some embodiments, the mineral base particle includes igneous rock. In some embodiments, the mineral base particle includes carbonaceous rock. In some embodiments, the mineral base particle includes combinations or igneous rock and carbonaceous rock. In some embodiments, the mineral base particle includes only igneous rock, and/or carbonaceous rock. In some embodiments, the mineral base particle includes other particles in addition to igneous rock, and/or carbonaceous rock.

In some embodiments, the mineral base particle has a total solar reflectance (TSR) of at least 20% and an average L* less than 30. In some embodiments, the mineral base particle has a TSR of at least 21% and an average L* less than 30. In some embodiments, the mineral base particle has a TSR of at least 22% and an average L* less than 30. In some embodiments, the mineral base particle has a TSR of at least 23% and an average L* less than 30. In some embodiments, the mineral base particle has a TSR of at least 24% and an average L* less than 30. In some embodiments, the mineral base particle has a TSR of at least 25% and an average L* less than 30. In some embodiments, the mineral base particle has a TSR of at least 30% and an average L* less than 30. In some embodiments, the mineral base particle has a TSR of at least 35% and an average L* less than 30. In some embodiments, the mineral base particle has a TSR of at least 40%. In some embodiments, the mineral base particle has a TSR of at least 45%. In some embodiments, the mineral base particle has a TSR of at least 50%.

In some embodiments, the mineral base particle has a TSR of at least 18%. In some embodiments, the mineral base particle has a TSR of at least 19%. In some embodiments, the mineral base particle has a TSR of at least 20%. In some embodiments, the mineral base particle has a TSR of at least 21%. In some embodiments, the mineral base particle has a TSR of at least 22%. In some embodiments, the mineral base particle has a TSR of at least 23%. In some embodiments, the mineral base particle has a TSR of at least 24%. In some embodiments, the mineral base particle has a TSR of at least 25%. In some embodiments, the mineral base particle has a TSR of at least 30%.

In some embodiments, the mineral base particle has a TSR of 18%. In some embodiments, the mineral base particle has a TSR of 19%. In some embodiments, the mineral base particle has a TSR of 20%. In some embodiments, the mineral base particle has a TSR of 21%. In some embodiments, the mineral base particle has a TSR of 22%. In some embodiments, the mineral base particle has a TSR of 23%. In some embodiments, the mineral base particle has a TSR of 24%. In some embodiments, the mineral base particle has a TSR of 25%. In some embodiments, the mineral base particle has a TSR of 30%.

In some embodiments, the mineral base particle has a TSR of 18% to 30%. In some embodiments, the mineral base particle has a TSR of 19% to 30%. In some embodiments, the mineral base particle has a TSR of 20% to 30%. In some embodiments, the mineral base particle has a TSR of 21% to 30%. In some embodiments, the mineral base particle has a TSR of 22% to 30%. In some embodiments, the mineral base particle has a TSR of 23% to 30%. In some embodiments, the mineral base particle has a TSR of 24% to 30%. In some embodiments, the mineral base particle has a TSR of 25% to 30%.

In some embodiments, one or more of the coated granules of the plurality of coated granules includes a coating on the mineral base particle. In some embodiments, each of the coated granules of the plurality of coated granules includes a coating on the mineral base particle. In some embodiments, the coating includes a metal silicate. In some embodiments, the coating includes a reflective pigment. In some embodiments, the coating includes both a metal silicate and a reflective pigment.

In some embodiments, the coated granules of the plurality of coated granules have an average L* value of less than 35. In some embodiments, the coated granules of the plurality of coated granules have an average L* value of less than 34. In some embodiments, the coated granules of the plurality of coated granules have an average L* value of less than 33. In some embodiments, the coated granules of the plurality of coated granules have an average L* value of less than 32. In some embodiments, the coated granules of the plurality of coated granules have an average L* value of less than 31. In some embodiments, the coated granules of the plurality of coated granules have an average L* value of less than 30. In some embodiments, the coated granules of the plurality of coated granules have an average L* value of less than 29. In some embodiments, the coated granules of the plurality of coated granules have an average L* value of less than 28. In some embodiments, the coated granules of the plurality of coated granules have an average L* value of less than 27. In some embodiments, the coated granules of the plurality of coated granules have an average L* value of less than 26. In some embodiments, the coated granules of the plurality of coated granules have an average L* value of less than 25.

In some embodiments, the coated granules of the plurality of coated granules have an average L* value of 35. In some embodiments, the coated granules of the plurality of coated granules have an average L* value of 34. In some embodiments, the coated granules of the plurality of coated granules have an average L* value of 33. In some embodiments, the coated granules of the plurality of coated granules have an average L* value of 32. In some embodiments, the coated granules of the plurality of coated granules have an average L* value of 31. In some embodiments, the coated granules of the plurality of coated granules have an average L* value of 30. In some embodiments, the coated granules of the plurality of coated granules have an average L* value of 29. In some embodiments, the coated granules of the plurality of coated granules have an average L* value of 28. In some embodiments, the coated granules of the plurality of coated granules have an average L* value of 27. In some embodiments, the coated granules of the plurality of coated granules have an average L* value of 26. In some embodiments, the coated granules of the plurality of coated granules have an average L* value of 25.

In some embodiments, the coated granules of the plurality of coated granules have an average L* value of 25 to 35. In some embodiments, the coated granules of the plurality of coated granules have an average L* value of 26 to 35. In some embodiments, the coated granules of the plurality of coated granules have an average L* value of 27 to 35. In some embodiments, the coated granules of the plurality of coated granules have an average L* value of 28 to 35. In some embodiments, the coated granules of the plurality of coated granules have an average L* value of 29 to 35. In some embodiments, the coated granules of the plurality of coated granules have an average L* value of 30 to 35.

In some embodiments, the coated granules of the plurality of coated granules have a total solar reflectance (TSR) of at least 18%. In some embodiments, the TSR is at least 19%. In some embodiments, the TSR is at least 20%. In some embodiments, the TSR is at least 21%. In some embodiments, the TSR is at least 22%. In some embodiments, the TSR is at least 23%. In some embodiments, the TSR is at least 24%. In some embodiments, the TSR is at least 25%. In some embodiments, the TSR is at least 30%. In some embodiments, the TSR is at least 35%. In some embodiments, the TSR is at least 40%. In some embodiments, the TSR is at least 45%. In some embodiments, the TSR is at least 50%.

In some embodiments, the TSR is 18%. In some embodiments, the TSR is 19%. In some embodiments, the TSR is 20%. In some embodiments, the TSR is 21%. In some embodiments, the TSR is 22%. In some embodiments, the TSR is 23%. In some embodiments, the TSR is 24%. In some embodiments, the TSR is 25%. In some embodiments, the TSR is 30%. In some embodiments, the TSR is 35%. In some embodiments, the TSR is 40%. In some embodiments, the TSR is 45%. In some embodiments, the TSR is 50%.

In some embodiments, the TSR is 18% to 50%. In some embodiments, the TSR is 18% to 45%. In some embodiments, the TSR is 18% to 40%. In some embodiments, the TSR is 18% to 35%. In some embodiments, the TSR is 18% to 30%. In some embodiments, the TSR is 18% to 25%.

In some embodiments, the TSR is 19% to 50%. In some embodiments, the TSR is 19% to 45%. In some embodiments, the TSR is 19% to 40%. In some embodiments, the TSR is 19% to 35%. In some embodiments, the TSR is 19% to 30%. In some embodiments, the TSR is 19% to 25%. In some embodiments, the TSR is 19% to 25%.

In some embodiments, the TSR is 20% to 50%. In some embodiments, the TSR is 20% to 45%. In some embodiments, the TSR is 20% to 40%. In some embodiments, the TSR is 20% to 35%. In some embodiments, the TSR is 20% to 30%. In some embodiments, the TSR is 20% to 25%.

In some embodiments, the TSR is 21% to 50%. In some embodiments, the TSR is 21% to 45%. In some embodiments, the TSR is 21% to 40%. In some embodiments, the TSR is 21% to 35%. In some embodiments, the TSR is 21% to 30%.

In some embodiments, the TSR is 22% to 50%. In some embodiments, the TSR is 22% to 45%. In some embodiments, the TSR is 22% to 40%. In some embodiments, the TSR is 22% to 35%. In some embodiments, the TSR is 22% to 30%.

In some embodiments, the TSR is 23% to 50%. In some embodiments, the TSR is 23% to 45%. In some embodiments, the TSR is 23% to 40%. In some embodiments, the TSR is 23% to 35%. In some embodiments, the TSR is 23% to 30%.

In some embodiments, the TSR is 24% to 50%. In some embodiments, the TSR is 24% to 45%. In some embodiments, the TSR is 24% to 40%. In some embodiments, the TSR is 24% to 35%. In some embodiments, the TSR is 25% to 50%. In some embodiments, the TSR is 25% to 45%. In some embodiments, the TSR is 25% to 40%. In some embodiments, the TSR is 25% to 35%.

In some embodiments, the TSR is 30% to 50%. In some embodiments, the TSR is 30% to 45%. In some embodiments, the TSR is 30% to 40%. In some embodiments, the TSR is 35% to 50%. In some embodiments, the TSR is 35% to 45%. In some embodiments, the TSR is 40% to 50%.

In some embodiments, for the coated granules, a ratio of an average L* value to the total solar reflectance is less than 150. In some embodiments, the ratio is less than 145. In some embodiments, the ratio is less than 140. In some embodiments, the ratio is less than 135. In some embodiments, the ratio is less than 130. In some embodiments, the ratio is less than 125. In some embodiments, the ratio is less than 120. In some embodiments, the ratio is less than 115. In some embodiments, the ratio is less than 110. In some embodiments, the ratio is less than 105. In some embodiments, the ratio is less than 100. In some embodiments, the ratio is less than 95. In some embodiments, the ratio is less than 90. In some embodiments, the ratio is less than 85. In some embodiments, the ratio is less than 80. In some embodiments, the ratio is less than 75. In some embodiments, the ratio is less than 70. In some embodiments, the ratio is less than 65. In some embodiments, the ratio is less than 60. In some embodiments, the ratio is less than 55. In some embodiments, the ratio is less than 50.

In some embodiments, the ratio is 150. In some embodiments, the ratio is 145. In some embodiments, the ratio is 140. In some embodiments, the ratio is 135. In some embodiments, the ratio is 130. In some embodiments, the ratio is 125. In some embodiments, the ratio is 120. In some embodiments, the ratio is 115. In some embodiments, the ratio is 110. In some embodiments, the ratio is 105. In some embodiments, the ratio is 100. In some embodiments, the ratio is 95. In some embodiments, the ratio is 90. In some embodiments, the ratio is 85. In some embodiments, the ratio is 80. In some embodiments, the ratio is 75. In some embodiments, the ratio is 70. In some embodiments, the ratio is 65. In some embodiments, the ratio is 60. In some embodiments, the ratio is 55. In some embodiments, the ratio is 50.

In some embodiments, the ratio is 75 to 150. In some embodiments, the ratio is 80 to 150. In some embodiments, the ratio is 85 to 150. In some embodiments, the ratio is 90 to 150. In some embodiments, the ratio is 95 to 150. In some embodiments, the ratio is 100 to 150. In some embodiments, the ratio is 75 to 145. In some embodiments, the ratio is 80 to 145. In some embodiments, the ratio is 85 to 145. In some embodiments, the ratio is 90 to 145. In some embodiments, the ratio is 95 to 145. In some embodiments, the ratio is 100 to 145. In some embodiments, the ratio is 75 to 140. In some embodiments, the ratio is 80 to 140. In some embodiments, the ratio is 85 to 140. In some embodiments, the ratio is 90 to 140. In some embodiments, the ratio is 95 to 140. In some embodiments, the ratio is 100 to 140.

In some embodiments, the ratio is 75 to 135. In some embodiments, the ratio is 80 to 135. In some embodiments, the ratio is 85 to 135. In some embodiments, the ratio is 90 to 135. In some embodiments, the ratio is 95 to 135. In some embodiments, the ratio is 100 to 135. In some embodiments, the ratio is 75 to 130. In some embodiments, the ratio is 80 to 130. In some embodiments, the ratio is 85 to 130. In some embodiments, the ratio is 90 to 130. In some embodiments, the ratio is 95 to 130. In some embodiments, the ratio is 100 to 130. In some embodiments, the ratio is 105 to 130.

In some embodiments, the ratio is 75 to 125. In some embodiments, the ratio is 80 to 125. In some embodiments, the ratio is 85 to 125. In some embodiments, the ratio is 90 to 125. In some embodiments, the ratio is 95 to 125. In some embodiments, the ratio is 100 to 125. In some embodiments, the ratio is 75 to 120. In some embodiments, the ratio is 80 to 120. In some embodiments, the ratio is 85 to 120. In some embodiments, the ratio is 90 to 120. In some embodiments, the ratio is 75 to 115. In some embodiments, the ratio is 80 to 115. In some embodiments, the ratio is 85 to 115.

In some embodiments, the average L* value is 30, and the total solar reflectance is 0.20, such that the ratio is 150. In some embodiments, the average L* value is 30, and the total solar reflectance is 0.40, such that the ratio is 75.

In some embodiments, the plurality of coated granules covers at least 40% of a total surface area of a top surface of the roofing shingle. In some embodiments, the granules cover at least 45% of the top surface. In some embodiments, the granules cover at least 50% of the top surface. In some embodiments, the granules cover at least 55% of the top surface. In some embodiments, the granules cover at least 60% of the top surface. In some embodiments, the granules cover at least 65% of the top surface. In some embodiments, the granules cover at least 70% of the top surface. In some embodiments, the granules cover at least 75% of the top surface. In some embodiments, the granules cover at least 80% of the top surface. In some embodiments, the granules cover at least 85% of the top surface. In some embodiments, the granules cover at least 90% of the top surface. In some embodiments, the granules cover at least 95% of the top surface. In some embodiments, the granules cover at least 96% of the top surface. In some embodiments, the granules cover at least 97% of the top surface. In some embodiments, the granules cover at least 98% of the top surface. In some embodiments, the granules cover at least 99% of the top surface.

In some embodiments, the granules cover 40% of the top surface. In some embodiments, the granules cover 45% of the top surface. In some embodiments, the granules cover 50% of the top surface. In some embodiments, the granules cover 55% of the top surface. In some embodiments, the granules cover 60% of the top surface. In some embodiments, the granules cover 65% of the top surface. In some embodiments, the granules cover 70% of the top surface. In some embodiments, the granules cover 75% of the top surface. In some embodiments, the granules cover 80% of the top surface. In some embodiments, the granules cover 85% of the top surface. In some embodiments, the granules cover 90% of the top surface. In some embodiments, the granules cover 95% of the top surface. In some embodiments, the granules cover 96% of the top surface. In some embodiments, the granules cover 97% of the top surface. In some embodiments, the granules cover 98% of the top surface. In some embodiments, the granules cover 99% of the top surface. In some embodiments, the granules cover 100% of the top surface.

In some embodiments, the granules cover 40% to 100% of the top surface. In some embodiments, the granules cover 45% to 100% of the top surface. In some embodiments, the granules cover 50% to 100% of the top surface. In some embodiments, the granules cover 55% to 100% of the top surface. In some embodiments, the granules cover 60% to 100% of the top surface. In some embodiments, the granules cover 65% to 100% of the top surface. In some embodiments, the granules cover 70% to 100% of the top surface. In some embodiments, the granules cover 75% to 100% of the top surface. In some embodiments, the granules cover 80% to 100% of the top surface.

In some embodiments, the granules cover 40% to 99% of the top surface. In some embodiments, the granules cover 45% to 99% of the top surface. In some embodiments, the granules cover 50% to 99% of the top surface. In some embodiments, the granules cover 55% to 99% of the top surface. In some embodiments, the granules cover 60% to 99% of the top surface. In some embodiments, the granules cover 65% to 99% of the top surface. In some embodiments, the granules cover 70% to 99% of the top surface. In some embodiments, the granules cover 75% to 99% of the top surface. In some embodiments, the granules cover 80% to 99% of the top surface.

In some embodiments, the granules cover 40% to 95% of a total surface area of a top surface of the roofing shingle. In some embodiments, the granules cover 45% to 95% of a total surface area of a top surface of the roofing shingle. In some embodiments, the granules cover 50% to 95% of a total surface area of a top surface of the roofing shingle. In some embodiments, the granules cover 55% to 95% of a total surface area of a top surface of the roofing shingle. In some embodiments, the granules cover 60% to 95% of a total surface area of a top surface of the roofing shingle. In some embodiments, the granules cover 65% to 95% of a total surface area of a top surface of the roofing shingle. In some embodiments, the granules cover 70% to 95% of the top surface. In some embodiments, the granules cover 75% to 95% of the top surface. In some embodiments, the granules cover 80% to 95% of the top surface.

In some embodiments, the plurality of coated granules may coat only a reveal portion of the roofing shingle. In some embodiments, the plurality of coated granules may coat both a reveal portion and an overlap portion of the roofing shingle.

In some embodiments, at least some of the mineral base particles have a particle size of at most US sieve #6 (i.e., 0.093 inches). In some embodiments, at least some of the mineral base particles have a particle size of least US sieve #80 (i.e., 0.0070). In some embodiments, at least some of the mineral base particles have a particle size of at most US sieve #6 and of least US sieve #80. In some embodiments, each of the mineral base particles has a particle size of at most US sieve #6. In some embodiments, each of the mineral base particles has a particle size of least US sieve #80. In some embodiments, each of the mineral base particles has a particle size of at most US sieve #6 and of least US sieve #80.

In some embodiments, the present invention provides a bundle of roofing shingles. In some embodiments, the shingle bundle includes a plurality of roofing shingles. In some embodiments, the plurality of roofing shingles includes at least a first roofing shingle. In some embodiments, the first roofing shingle is as described herein. In some embodiments, the plurality of roofing shingles include at least a second roofing shingle. In some embodiments, the first roofing shingle and the second roofing shingle are stacked on one another. In some embodiments, the second roofing shingle is as described herein. In some embodiments, the plurality of roofing shingles include at least a third roofing shingle. In some embodiments, the third roofing shingle is as described herein. In some embodiments, the plurality of roofing shingles include more than three roofing shingle. In some embodiments, one or more, or each, of the roofing shingles is as described herein.

In some embodiments, the shingle bundle includes a first roofing shingle. In some embodiments, the shingle bundle includes a second roofing shingle. In some embodiments, the second roofing shingle is stacked on the first roofing shingle. In some embodiments, each of the first roofing shingle and the second roofing shingle includes a substrate, having a top surface and a bottom surface opposite the top surface, an asphalt-filled layer on the top surface of the substrate, and a plurality of coated granules on the asphalt-filled layer. In some embodiments, each of the coated granules of the plurality of coated granules includes a mineral base particle, and a coating, including metal silicate, and a reflective pigment. In some embodiments, the coated granules of the plurality of coated granules have an average L* value of less than 30, and a total solar reflectance of at least 20%. In some embodiments, the coated granules of the plurality of coated granules have an average L* value, and a total solar reflectance, and a ratio of the average L* value to the total solar reflectance is at most 150.

In some embodiments, the present invention provides a method including obtaining a substrate, the substrate having a top surface and a bottom surface opposite the top surface. In some embodiments, the method includes coating at least a portion of the top surface of the substrate with an asphalt-filled material, thereby forming an asphalt-filled layer on the substrate. In some embodiments, the method includes disposing a plurality of coated granules on the asphalt-filled layer. In some embodiments, each of the coated granules of the plurality of coated granules is as described herein.

In some embodiments, the method includes obtaining a substrate, the substrate having a top surface and a bottom surface opposite the top surface. In some embodiments, the method includes positioning an asphalt-filled layer on at least a portion of the top surface of the substrate. In some embodiments, the method includes disposing a plurality of coated granules on the asphalt-filled layer. In some embodiments, each of the coated granules of the plurality of coated granules is as described herein.

In some embodiments, the method includes obtaining a substrate, the substrate having a top surface and a bottom surface opposite the top surface. In some embodiments, the method includes coating at least a portion of the top surface of the substrate with an asphalt-filled material, thereby forming an asphalt-filled layer on the substrate. In some embodiments, the method includes disposing a plurality of coated granules on the asphalt-filled layer. In some embodiments, each of the coated granules of the plurality of coated granules includes a mineral base particle, and a coating, including metal silicate, and a reflective pigment. In some embodiments, the coated granules of the plurality of coated granules have an average L* value of less than 30, and a total solar reflectance of at least 20%. In some embodiments, the coated granules of the plurality of coated granules have an average L* value, and a total solar reflectance, and a ratio of the average L* value to the total solar reflectance is at most 150.

In some embodiments, the method includes obtaining a substrate, the substrate having a top surface and a bottom surface opposite the top surface. In some embodiments, the method includes positioning an asphalt-filled material on at least a portion of the top surface of the substrate. In some embodiments, the method includes disposing a plurality of coated granules on the asphalt-filled layer. In some embodiments, each of the coated granules of the plurality of coated granules includes a mineral base particle, and a coating, includes metal silicate, and a reflective pigment. In some embodiments, the coated granules of the plurality of coated granules have an average L* value of less than 30, and a total solar reflectance of at least 20%. In some embodiments, the coated granules of the plurality of coated granules have an average L* value, and a total solar reflectance, and a ratio of the average L* value to the total solar reflectance is at most 150.

In some embodiments, average a* values of the coated granules, in accordance with CIE LAB color data, may be −2 to 2. In some embodiments, the average a* values may be less than −2. In some embodiments, the average a* values may be greater than to 2. In some embodiments, average b* values of the coated granules, in accordance with CIE LAB color data, may be −2 to 2. In some embodiments, the average b* values may be less than −2. In some embodiments, the average b* values may be greater than to 2.

In some embodiments, the coated granules may have a dark color. In some embodiments, the coated granules may have an earth tone color.

In some embodiments, the base particles may be highly reflective base particles of one or more of colored polymeric particles, colored slate flakes, colored ceramic particles, colored rubber particles, colored composite particles, particles made from recycled bricks, ceramic articles, recycled shingles, colored plastic granules, colored aluminum flakes or metal flakes, colored plastic chips, colored concrete particles, colored cementitious particles, and/or combinations thereof.

The following method may be used to determine the average L* value for a roofing shingle that includes granules on its top surface. An L* value may be measured through a 1" diameter port at two or more locations on the top surface of the shingle which is covered by granules. For example, in some embodiments, the L* value may be measured at 5 to 40 locations, at 5 to 30 locations, or at 10 to 30 locations on the top surface of the shingle which are covered by the granules. The L' values for each of the locations may be averaged with one another, to provide the average L* value for the granules on the top surface of the roofing shingle. Similar methods may be used to measure average A* values and/or average B* values.

Figure 2:
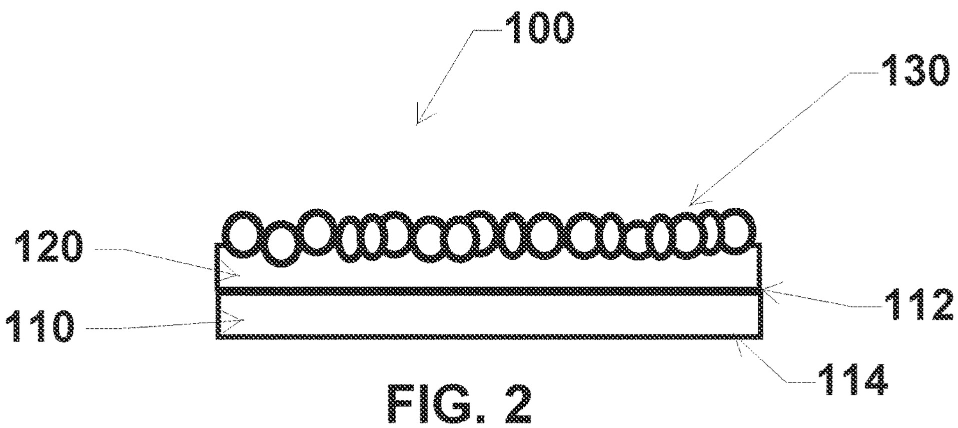
FIG. 2 is a cross-sectional view of the roofing shingle, in accordance with some embodiments of the invention.
Figure 3:
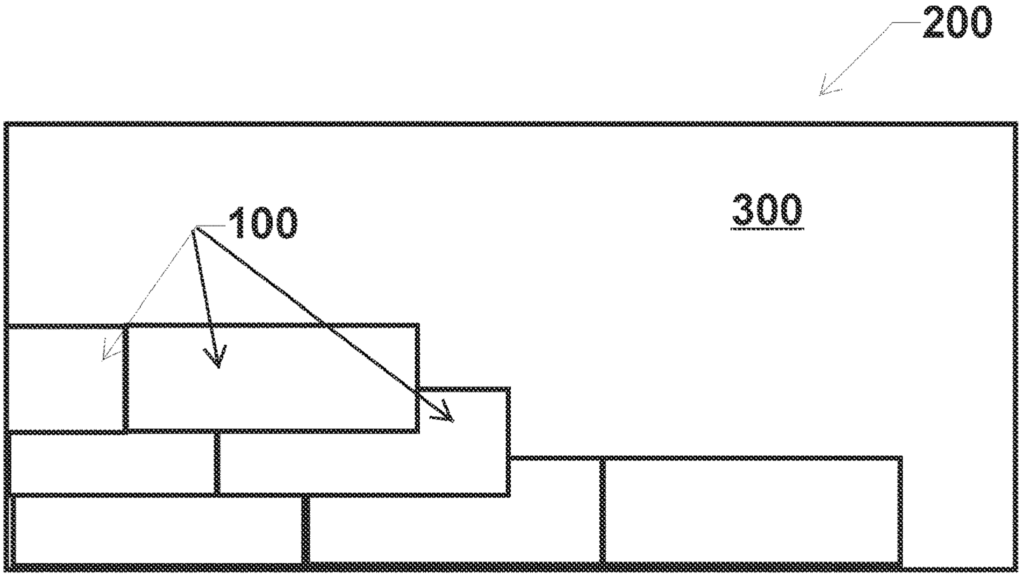
FIG. 3 is a top view of a roofing system including the roofing shingle, in accordance with some embodiments of the invention.

FIG. 1 is a top view of a roofing shingle 100, FIG. 2 is a cross-sectional view of the roofing shingle 100, and FIG. 3 is a top view of a roofing system 200 including a plurality of the roofing shingles 100, in accordance with some embodiments of the invention.

The roofing shingle 100 may be in accordance with the roofing shingle described herein. As shown, the roofing shingle 100 may include a substrate 110, as described. The substrate may have a top surface 112, and a bottom surface 114 that is opposite the top surface 112. The roofing shingle 100 may include an asphalt-filled layer 120 on the top surface 112 of the substrate 110, as described. The roofing shingle 100 may include a plurality of coated granules 130 on the asphalt-filled layer 120. The coated granules 130 may be as described herein—for example, the coated granules 130 may include a mineral base particle, and may include either or both of a coating including metal silicate and/or a reflective pigment on the mineral base particle.

Also as shown, the roofing system 200 may include one or more of the roofing shingles 100 (either full and/or partial shingles), installed above a roof deck 300, as described herein.

Below follow two comparative examples, and an example in accordance with the invention, of coated granules, as further described.

Comparative Example 1A

The coated granules of Example 1A include a blend of three types of dark-colored coated granules. The coated granules were prepared by coating base mineral particles. The base mineral particles include crushed rocks having low silica content, including basalt, rhyolite, and granite. The coating includes metal silicate and reflective pigments. The coated granules within the three types were evaluated, and the average L* and total solar reflectance (TSR) for each of the three types are indicated in Table 1A. More specifically, for each granule type, the coated granules were placed in a petri dish, and a top surface of the granules within the petri dish was leveled, such that the top surface was substantially flat. The CIE Lab L* value was measured at one location through a 1" diameter port. The petri dish was then rotated 90 degrees, and another CIE Lab L* value was measured. The 90 degree rotation and measurement occurred two more times, to provide a total of four CIE Lab L* values, for each granule type. The CIE Lab L* Values were then averaged, providing the Average CIE Lab L* Value in Table 1A for each granule type. The table also indicates a ratio of the average L* value to the total solar reflectance for each of the three types of coated granules. A similar method was performed to measure the total solar reflectance for each granule type. In particular, for each granule type, the coated granules were placed in a petri dish, and a top surface of the granules within the petri dish was leveled, such that the top surface was substantially flat. The TSR was measured at one location through a 1" diameter port. The petri dish was then rotated 90 degrees, and the TSR was measured. The 90 degree rotation and measurement occurred two more times, to provide a total of four TSR measurements, for each granule type. TSR measurements were then averaged, providing the TSR in Table 1A for each granule type.

TABLE 1A

| Granule Type | Average CIE Lab L* Value | Total Solar Reflectance (TSR) | Ratio of Average L* Value to TSR |
|---|---|---|---|
| 1 | 30.66 | 0.20 | 153 |
| 2 | 43.37 | 0.25 | 173 |
| 3 | 25.42 | 0.15 | 169 |

Comparative Example 1B

The coated granules of Example 1B include a blend of three types of dark-colored coated granules. The coated granules were prepared by coating base mineral particles. The base mineral particles include crushed rocks having low silica content, including basalt, rhyolite, and granite. The coating includes metal silicate and reflective pigments. The coated granules within the three types were evaluated, and the average L* and total solar reflectance for each of the three types are indicated in Table 1B. The table also indicates a ratio of the average L* value to the total solar reflectance for each of the three types of coated granules. The average L* values and TSR were measured and determined using methods similar to those discussed above in Example 1A, including rotation, measurement, and averaging.

TABLE 1B

| Granule Type | Average CIE Lab L* Value | Total Solar Reflectance (TSR) | Ratio of Average L* Value to TSR |
|---|---|---|---|
| 1 | 28.46 | 0.18 | 158 |
| 2 | 36.37 | 0.21 | 173 |
| 3 | 22.19 | 0.13 | 171 |

Example 2

The coated granules of Example 2, in accordance with the invention, include a blend of three types of dark-colored coated granules. The coated granules were prepared by coating highly reflective base mineral particles. The base mineral particles include igneous rocks and carbonaceous rocks. The base mineral particles have average TSR higher than 20%. The coating includes metal silicate and reflective pigments. The coated granules within the three types were evaluated, and the average L* and total solar reflectance for each of the three types are indicated in Table 2. The table also indicates a ratio of the average L* value to the total solar reflectance for each of the three types of coated granules. The average L* values and TSR were measured and determined using methods similar to those discussed above in Example 1A, including rotation, measurement, and averaging.

TABLE 2

| Granule Type | Average CIE Lab L* Value | Total Solar Reflectance (TSR) | Ratio of Average L* Value to TSR |
|---|---|---|---|
| 1 | 31.10 | 0.28 | 111 |
| 2 | 27.07 | 0.27 | 100 |
| 3 | 23.66 | 0.24 | 99 |

Thus, Tables 1A and 1B show, among other things, that for the coated granules of Examples 1A and 1B, for average L* values of less than 30, the total solar reflectance is less than 20% (i.e., 0.20). However, Table 2 shows that for the coated granules of Example 2, for average L* values of less than 30, the total solar reflectance is greater than 20% (i.e., 0.20).

Tables 1A, 1B, and 2 also illustrate, among other things, that for the coated granules of Examples 1A and 1B, a ratio of the average L* value to the total solar reflectance is greater than 150, while the ratio of the average L* value to the total solar reflectance for the coated granules of Example 2 is less than 150—e.g., a ratio of an average L* value of 30 to a total solar reflectance of 0.20.

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A roofing shingle, comprising:
- a substrate;
- an asphalt-filled layer on a surface of the substrate; and
- a plurality of coated granules on the asphalt-filled layer,
  - wherein each of the coated granules of the plurality of coated granules comprises:
    - a base particle having an average L* value of less than 30 and a total solar reflectance of at least 20%, and
    - a coating on the base particle, the coating comprising:
      - metal silicate, and
      - a reflective pigment,
  - wherein the coated granules of the plurality of coated granules have:
    - an average L* value of less than 30, and
    - a total solar reflectance of 20% to 40%.

2. The roofing shingle of claim 1, wherein each of the base particles comprises at least one of igneous rock or carbonaceous rock.

3. The roofing shingle of claim 1, wherein each of the base particles has a total solar reflectance of at least 40%.

4. The roofing shingle of claim 1, wherein the plurality of coated granules covers at least 80% of a top surface of the roofing shingle.

5. The roofing shingle of claim 4, wherein the plurality of coated granules covers at least 90% of the top surface of the roofing shingle.

6. The roofing shingle of claim 1, wherein each of the base particles has a particle size of US sieve #80 to US sieve #6.

7. The roofing shingle of claim 1, wherein the average L* value of the coated granules is less than 25.

8. A roofing shingle, comprising:
a substrate;
an asphalt-filled layer on a surface of the substrate; and
a plurality of coated granules on the asphalt-filled layer,
wherein each of the coated granules of the plurality of coated granules comprises:
a base particle having an average L* value less than 30 and total solar reflectance of at least 20%, and
a coating on the base particle, the coating comprising:
metal silicate, and
a reflective pigment,
wherein the coated granules of the plurality of coated granules have:
an average L* value of less than 30, and
a total solar reflectance,
wherein a ratio of the average L* value to the total solar reflectance is 75 to 105.

9. The roofing shingle of claim 8, wherein each of the base particles comprises at least one of igneous rock or carbonaceous rock.

10. The roofing shingle of claim 8, wherein each of the base particles has a total solar reflectance of at least 40%.

11. The roofing shingle of claim 8, wherein the plurality of coated granules covers at least 80% of a top surface of the roofing shingle.

12. The roofing shingle of claim 8, wherein each of the base particles has a particle size of US sieve #80 to US sieve #6.

13. The roofing shingle of claim 8, wherein the average L* value of the coated granules is less than 25.

14. A system, comprising:
a roof deck; and
a first roofing shingle installed on the roof deck,
wherein the first roofing shingle comprises:
a substrate;
an asphalt-filled layer on a surface of the substrate; and
a plurality of coated granules on the asphalt-filled layer,
wherein each of the coated granules of the plurality of coated granules comprises:
a base particle having an average L* value less than 30 and total solar reflectance of at least 20%, and
a coating, comprising:
metal silicate, and
a reflective pigment,
wherein the coated granules of the plurality of coated granules have:
an average L* value of less than 30, and
a total solar reflectance, wherein a ratio of the average L* value to the total solar reflectance is 75 to 105.

15. The system of claim 14, wherein each of the base particles comprises at least one of igneous rock or carbonaceous rock.

16. The system of claim 14, wherein each of the base particles has a total solar reflectance of at least 40%.

17. The system of claim 14, wherein the plurality of coated granules covers at least 80% of a total surface area of a top surface of the first roofing shingle.

18. The system of claim 17, wherein the plurality of coated granules covers at least 90% of the total surface area of the top surface of the first roofing shingle.

19. The system of claim 14, wherein each of the base particles has a particle size of at most US sieve #6, and of at least US sieve #80.

20. The system of claim 14, wherein the average L* value of the coated granules is less than 25.

* * * * *